Withers & Dolfinger.
Churn Dasher.
N° 88,688. Patented Apr. 6, 1869.

Witnesses:
W. C. Ashkettle
Wm A Morgan

Inventor:
T. H. Withers
J. Dolfinger
per Munn & Co
Attorneys

THOMAS H. WITHERS AND JACOB DOLFINGER, OF LOUISVILLE, KENTUCKY.

Letters Patent No. 88,688, dated April 6, 1869; antedated April 1, 1869.

IMPROVEMENT IN CHURN-DASHERS.

The Schedule referred to in these Letters Patent and making part of the same.

*To all whom it may concern:*

Be it known that we, THOMAS H. WITHERS and JACOB DOLFINGER, of Louisville, in the county of Jefferson, and State of Kentucky, have invented a new and useful Improvement in Churn-Dashers; and we do hereby declare that the following is a full, clear, and exact description thereof, which will enable others skilled in the art to make and use the same, reference being had to the accompanying drawings, forming part of this specification.

Similar letters of reference indicate corresponding parts.

Our invention has for its object, to furnish an improved churn-dasher, simple in construction, not liable to get out of order, easily detached from the handle, for washing and cleaning-purposes, and which will bring the butter very quick, developing all the butter that may be in the milk; and It consists in a revolving single screw, perforated dasher, detachably secured to the dasher-handle, as hereinafter more fully described.

A is the dasher-handle, consisting of a wooden staff, upon the lower end of which is formed a long, round tenon, which passes through the hub of the screw B.

Figure 1:
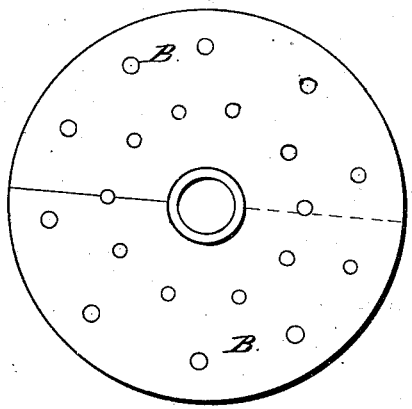
Figure 1 is a detail top view of our improved churn-dasher.

B is a single screw, attached to or formed upon a long hub. The blade of the screw B is perforated with numerous holes, as shown in fig. 1.

C are ferrules, placed upon the dasher-handle A, the one above, and the other below the hub of the screw B. The ferrules C are detachably secured to the dasher-handle by pins passing through the said ferrules, and through the dasher-handle A, as shown in fig. 2, so that the ferrules may be detached, or slipped from the said handle, by simply removing the said pins.

Figure 2:
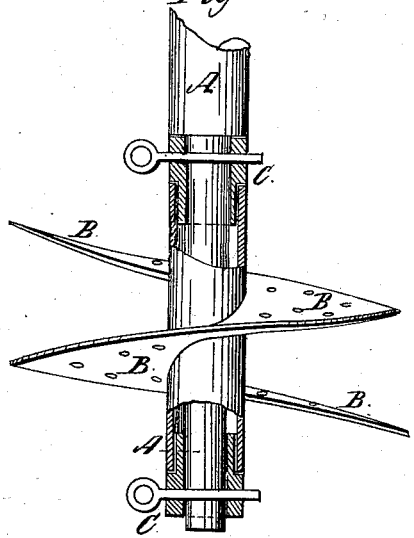
Figure 2 is a side view of the same, attached to the dasher-handle, parts being broken away, to show the construction.

The ends of the ferrules C are so formed as to enter the ends of the hub of the screw B, and form the bearings upon which the said hub revolves, as shown in fig. 2.

By this construction of dasher, as the said dasher moves up and down through the cream, the perforations of the blade of the screw, and the revolution of the screw itself, break up the cream very quickly and thoroughly, bringing the butter in a very short time, and developing all the butter that may be in the cream.

Another effect of the dasher thus constructed, is to gather the butter, so that it may all be removed from the milk.

By simply detaching the lower ferrule, the screw B may be conveniently removed from the dasher-handle A, so that it may be easily washed and cleaned.

We claim as new, and desire to secure by Letters Patent—

1. The single perforated screw B, revolving loosely upon, and detachably secured to the dasher-handle A, substantially as herein shown and described, and for the purpose set forth.

2. The combination of the detachable ferrules C with the dasher-handle A, and with the hub of the screw B, substantially as herein shown and described, and for the purpose set forth.

The above specification of our invention, signed by us, this 11th day of April, 1868.

THOMAS H. WITHERS.
J. DOLFINGER.

Witnesses:
E. C. PFINGST,
OTTO DOLFINGER.